E. J. DOUGHERTY.
AGRICULTURAL IMPLEMENT.
APPLICATION FILED JAN. 23, 1917.
1,292,391.
Patented Jan. 21, 1919.
2 SHEETS—SHEET 1.
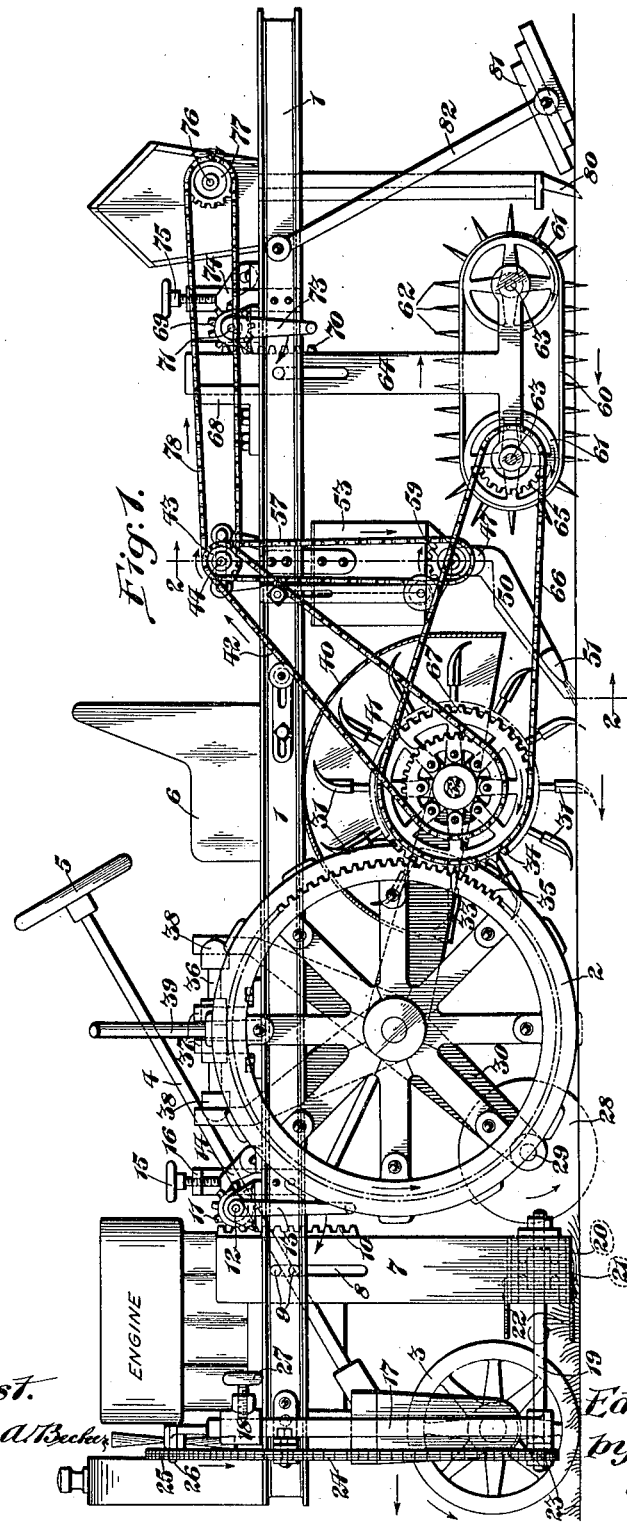

E. J. DOUGHERTY.
AGRICULTURAL IMPLEMENT.
APPLICATION FILED JAN. 23, 1917.
1,292,391.
Patented Jan. 21, 1919.
2 SHEETS—SHEET 2.
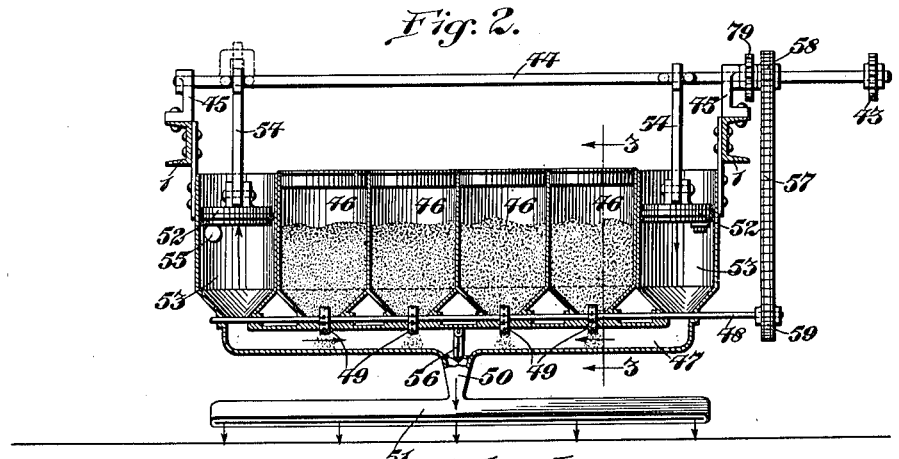
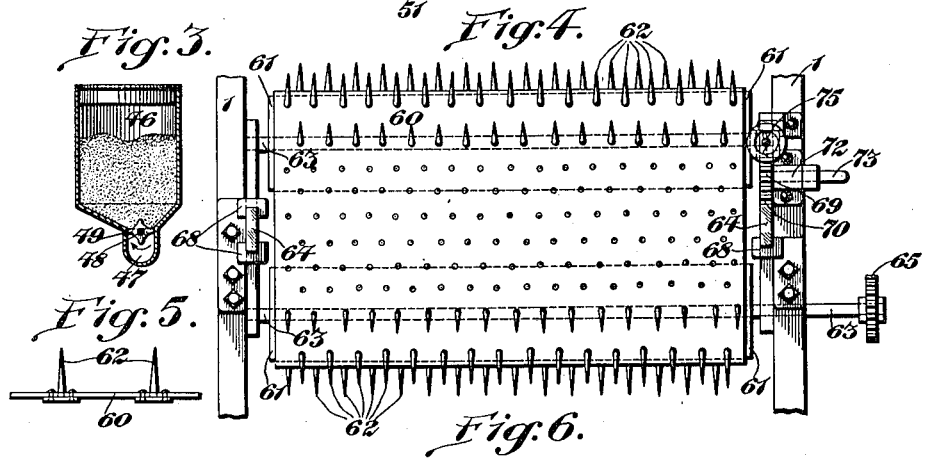
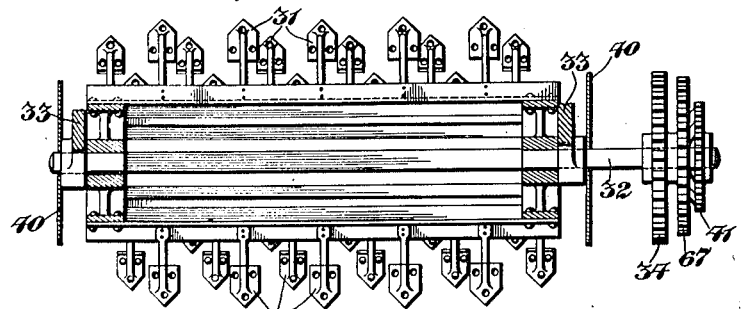
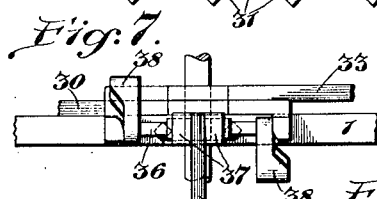
Attest.
Charles A. Becker.
Inventor:
Edward J. Dougherty
by Rippey & Kingsland
his Attorneys.

UNITED STATES PATENT OFFICE.

EDWARD J. DOUGHERTY, OF ST. LOUIS, MISSOURI.

AGRICULTURAL IMPLEMENT.

1,292,391. Specification of Letters Patent. Patented Jan. 21, 1919.

Application filed January 23, 1917. Serial No. 144,086.

*To all whom it may concern:*

Be it known that I, EDWARD J. DOUGHERTY, a citizen of the United States, residing at the city of St. Louis and State of Missouri, have invented a new and useful Agricultural Implement, of which the following is a specification.

This invention relates to agricultural implements.

The improvements of the present invention are embodied in an implement or machine of the general type constituting the subject-matter of my application Serial No. 129,721, filed November 6, 1916. The improvements of the present invention over the machine disclosed in said application relate generally to the organization and operation of the several mechanisms of the machine, and specifically to devices for controlling and operating the several mechanisms in order to coördinate their work or operation upon the ground, and also to certain additional features of invention which are not embodied in the machine of the said application. The present machine includes improved fertilizing mechanism for supplying fertilizer to the ground adjacent to the plowing mechanism and in advance of the pulverizing mechanism of the machine, so that the fertilizer will be thoroughly worked into the ground.

Other improvements are also contained in the machine, one of which comprises an improved and novel form of pulverizing mechanism.

The object of the invention is to provide an improved implement in which the various mechanisms thereof are coördinated and arranged to operate and coöperate so that the successful action thereof upon the ground or soil is automatically effected by the movement of the machine under control of a single propelling apparatus and whereby the soil is thoroughly worked and prepared and the planting also may be effected at a single operation.

In the drawings, Figure 1 is a side elevation of my improved implement.

Fig. 2 is a sectional view of the fertilizer supply mechanism taken on the line 2—2 of Fig. 1.

Fig. 3 is a detailed sectional view of one of the fertilizer supply receptacles taken on the line 3—3 of Fig. 2.

Fig. 4 is a plan view of the pulverizing mechanism constituting one of the novel elements of the implement.

Fig. 5 is a detailed view illustrating features of construction of the pulverizing device.

Fig. 6 is a sectional view of the plowing unit.

Fig. 7 is a view illustrating the details of the device for raising the soil cutter and the plowing mechanism from the ground.

The implement constituting the subject-matter of the present invention, like the implement of the application mentioned, is of the motor driven type in which the engine is mounted upon a frame 1. The frame is supported by large tractor wheels 2, and the third wheel 3 constitutes a part of the steering mechanism. The wheel 3 is controlled by the usual steering post 4 and wheel 5, the latter being in convenient relation to the operator's seat 6.

A depending frame 7 is supported by the frame 1 in advance of the tractor wheels 2 and is arranged for vertical adjustment, being provided with slots 8 receiving the lugs 9 by which the frame is guided in its movements and retained from lateral displacement. Each of the side members of the frame 7 is provided with a rack 10 said racks being meshed with pinions 11 attached to a shaft 12 extending transversely of the frame 1 and journaled in bearings thereon. A crank 13 is attached to one end of the shaft 12 so that said shaft may be rotated thereby as required to raise or lower the frame 7 to its different adjusted positions. Pawls 14 are pivoted upon the frame 1 and engage with the pinions 11 so that said pinions will be locked to support and hold the frame 7 in whatever position or adjustment it may be placed.

For preventing accidental disengagement of the pawls 14, locking screws 15 are employed. These locking screws are mounted in supports 16 and are provided with manually engageable handles, whereby they may be operated to engage or disengage the pawls as will be readily understood by reference to Fig. 1.

An upright 17 is operatively mounted in a guide 18 and the lower end thereof constitutes a bearing support for a shaft 19, the rear end of which is supported by the frame 7 and operates a roller 20. There is one of the rollers 20 at each side of the frame 7, and a belt 21 passes around said rollers and carries a series of arms 22, which serve to lay the vegetation transversely of the movement of the implement when the belt is operated and the implement is in motion. The forward end of the shaft 19 has a sprocket wheel 23 thereon, and a chain 24 passes around the sprocket wheel 23 and is operated by a sprocket wheel 25 on the fan shaft 26 of the engine. Thus, when the engine is operating, the device for laying the vegetation is also operated.

When the frame 7 is raised in the manner previously described, the upright 17 is also raised and the latter may be clamped or locked in any position or adjustment in which it is placed by a set screw 27 engaging the upright 17 in the guide 18.

The mechanism for cutting the vegetation and the soil into strips comprises a revoluble series of disk cutters 28. The disk cutters 28 are on a shaft 29 supported by the lower ends of the arms 30. The arms 30 are pivoted upon the axle of the tractor wheels and have upward extensions adapted to be engaged by an operating device for moving the arms to raise the cutters out of the ground under any desired circumstances.

The plowing mechanism includes revoluble series of plows 31 supported by a frame attached to a revoluble shaft 32 journaled in bearings in rearwardly extending arms 33 pivoted upon the axle of the tractor wheels. Said arms 33 also have upward extensions adapted to be engaged by an operated device, whereby said arms may be moved to raise the plowing mechanism out of the ground. The plowing mechanism is operated by a gear 34 attached to the shaft 32 meshing with a large gear 35 in connection with one of the tractor wheels, so that as the implement travels forwardly the plows are operated forwardly in the ground and thereby thoroughly break the ground which had been previously cut into strips by the cutters 28 in preparation for the operation of the plowing mechanism.

It is to be understood that there are two arms 30, one of them being at each side of the frame, and that there are also two arms 33, one of which is at each side of the frame.

As stated the upper ends of the arms 30 and 33 extend above the frame 1 and they are in bifurcated arrangement as shown in Fig. 1. Above each side member of the frame 1 a short shaft 36, is journaled in bearings 37 attached to the frame. Cams 38 are attached to each shaft 36 in position so that when said shafts are turned, the cams will engage the upper ends of the arms 30 and 33 and move said arms as required to raise the cutters 28 and the plowing mechanism out of the ground. As shown in Fig. 7, the cams 38 are provided with flat raised faces constituting abutments for the arms 30 and 33, so that the cams will not slip from position when they have been adjusted. Each shaft 36 has a handle 39 whereby the shaft may be operated as required to actuate the cams. The arms 33 support an inclosing cover 40 over the plowing mechanism to catch the soil and prevent it from being thrown too far by the plows.

The fertilizer distributer is coördinated with and operated by the plowing mechanism and will now be described. The shaft 32 has a sprocket wheel 41 secured thereto and drives a chain 42 passing over a sprocket wheel 43 attached to a crank shaft 44. The shaft 44 is mounted in bearings in supports 45 attached to the frame 1. The fertilizer is carried in containers 46 arranged in the form of a frame supported from the frame 1, as illustrated in Fig. 2. The bottoms of the containers are in the form of hoppers and each hopper has a slot through the bottom thereof opening into a passage 47. A shaft 48 extends transversely through the series of hoppers and has toothed or notched feed wheels 49 thereon operating in the slots, so that as an incident to the rotation of the shaft 48 the fertilizer will be uniformly fed from the hoppers into the passage 47. The teeth of the feed wheels serve as the devices for feeding and restricting the flow of the fertilizer.

From the passage 47 the fertilizer is forced through an outlet passage 50 into an elongated slotted discharge member 51 extending transversely adjacent to the plowing mechanism and arranged to discharge the fertilizer in the most advantageous position so that it will be mixed with the soil. The fertilizer is forced out of the passage 47 by air pressure controlled by pump devices operated by the crank shaft 44. Each pump device includes a piston 52 operating in a cylinder 53 and connected to the crank shaft 44 by a pitman rod 54, so that as the crank shaft rotates the pistons will be reciprocated. Each cylinder 53 has an air inlet 55 and when the piston passes below the air inlet, the air will be forced through the passage 47, thereby forcing the fertilizer into the passage 50 and thence to the discharge member 51. A swinging valve 56 is supported in the passage 47 and is swung from side to side by the air pressure coming from the respective pumps, as required to deflect the fertilizer into the passage 50. The shaft 48 is driven by a sprocket chain 57 passing over a sprocket wheel 58 on the crank shaft 44 and engaging a sprocket wheel 59 on said shaft 48.

It will be observed that the slotted discharge member 51 is supported so that the fertilizer and the air will be discharged under the soil falling from the plows 31. Thus the broken soil is thoroughly subjected to the action of air to considerable depth which is of much benefit and advantage to soil needing air elements. The injection of the air into the broken ground also assists in loosening and breaking the ground by keeping it in a loose condition for a sufficient time to enable the pulverizing mechanism to operate upon the broken ground. Furthermore, the air currents forced into the ground by the pump mechanism described thoroughly distribute the fertilizer by blowing it into the soil falling from the plowing mechanism, thus making a thorough mixture of the air and fertilizer with the broken soil. In some instances it may be unnecessary to use fertilizer and in such cases if desired, the air pump mechanism may be used to effect thorough aeration of the broken ground to enable the soil to extract from the air the necessary and needed atmospheric elements. In this way ground in certain conditions may be improved and given renewed and additional strength and improved qualities even in case the fertilizer is not needed.

The pulverizing mechanism, further working the ground after the fertilizer has been deposited, is also controlled and driven by the plowing mechanism and directly coordinated therewith. The pulverizing mechanism comprises an endless belt 60 passing around two transverse rollers 61 and equipped with numerous series of teeth 62 which operate in the ground by forward movement relative to the movement of the implement as the implement itself moves. The rollers are attached to shafts 63 supported by a vertically movable frame 64. The forward one of the shafts 63 is provided with a sprocket wheel 65 driven by a chain 66 passing around a sprocket wheel 67 attached to the shaft 32 of the plowing mechanism. The frame 64 is vertically movable in guides 68. Said frame is moved to and held in its adjusted positions by a pinion 69 meshing with a rack 70 on the frame 64. The pinion 69 is attached to a shaft 71 journaled in a bearing 72 on the frame 1 and capable of being rotated by a crank 73. The pinion may be locked and retained in any of its adjusted positions by a pawl 74 pivoted to the frame 1 and engaging the pinion. Accidental disengagement of the pawl is prevented by a screw 75 operating in a support adjacent to the pawl and provided with a handle, whereby it may be manipulated.

By operation of the actuating device, the frame 64 may be raised or lowered to work into the ground at any desired depths.

The planting mechanism may be of any usual construction or type, and it is unnecessary to illustrate the details thereof in this case. As usual the planting mechanism is controlled by a shaft 76, and in the present instance the shaft 76 is operated by a pinion 77 which is driven by a sprocket chain 78 operated from a sprocket wheel 79 on the crank shaft 44. The seeds are discharged from the hopper of the planting mechanism through chutes 80 disposed rearwardly from the pulverizer.

In some instances it is desired to level the ground and cover the seed after planting, and for this purpose I provide a drag 81 supported by links 82 swinging from the frame 1, so that the drag is operated immediately following the seed chutes 80.

From the foregoing it will be observed that various parts of my improved implement or machine are thoroughly coördinated so that they are operated by a single motive device, and each part of the implement performs a function directly related to and in preparation for the succeeding part of the machine. Thus, the vegetation layer places the vegetation for operation of the cutter, and the latter cuts the vegetation into short lengths and the soil into strips preparatory for the operation of the plowing mechanism, which breaks the ground and throws the soil upon the fertilizer, while the pulverizer following the plowing mechanism pulverizes the soil and completes the mixture of the fertilizer therewith in preparation for the planting mechanism.

I claim:

1. In an agricultural implement, a frame, land breaking mechanism in connection therewith, a fertilizer distributer for distributing fertilizer on the broken land, mechanism for forcing air into the broken land before the land settles after being broken by the land breaking mechanism, a pulverizer for operating on the land after the fertilizer has been placed on the land, and an engine for propelling the implement and operating the land breaking mechanism and the pulverizer.

2. In an agricultural implement, a frame, an engine for propelling the frame, ground breaking mechanism in connection with the frame, means for operating the ground breaking mechanism as the implement is moved, a fertilizer distributing device, means for operating said device from the ground breaking mechanism, mechanism for forcing air into the broken ground before the ground settles after being broken by the plow mechanism, a pulverizer, and means for operating the pulverizer from the ground breaking device.

3. An agricultural implement, comprising a power propelled frame, ground breaking plow mechanism, means for operating said plow mechanism, pulverizing mechanism for working the ground following the operation of the ground breaking mechanism, mechanism for forcing air into the broken ground before the ground settles after being broken by the plow mechanism, a fertilizer distributer between the plow mechanism and the pulverizer, and means operated by the plow mechanism for operating the fertilizer distributer.

4. An agricultural implement, comprising a power propelled frame, plow mechanism mounted in said frame for breaking the ground, fertilizer containers, devices for removing the fertilizer from said containers in measured quantities, means for operating said devices, mechanism operable to force the fertilizer and quantities of air into the ground before the ground settles after being broken by the plow mechanism, and a pulverizer for working the ground after the fertilizer and air have been forced into the ground.

5. An agricultural implement, comprising a power propelled frame, plow mechanism mounted in said frame for breaking the ground, a shaft, fertilizer containers, devices for removing the fertilizer from said containers in measured quantities, means for operating said devices from said shaft, mechanism driven by said shaft for forcing the fertilizer and quantities of air into the ground before the ground settles after being broken by the plow mechanism, a pulverizer driven by said shaft for working the ground after the fertilizer has been distributed on the ground, and planting mechanism operating to plant the seed in the ground after operation of the pulverizer.

6. An agricultural implement, comprising a power propelled frame, plow mechanism mounted in said frame for breaking the ground, a shaft, fertilizer containers, devices for removing the fertilizer from said containers in measured quantities, means for operating said devices from said shaft, mechanism driven by said shaft for forcing the fertilizer and quantities of air into the ground before the ground settles after being broken by the plow mechanism, a pulverizer driven by said shaft for working the ground after the fertilizer and air have been driven into the ground, planting mechanism operating to plant the seed in the ground after operation of the pulverizer, and a drag operated by said frame to level the ground after operation of the planting mechanism.

7. An agricultural implement, comprising mechanism for cutting the vegetation and breaking the ground, mechanism for forcing air into the broken ground before the ground settles after being broken, a pulverizer operating on the broken ground following the forcing of the air into the broken ground, means for varying the depth at which the pulverizer will work, and means for leveling the ground after operation of the pulverizer.

8. In an agricultural implement, a power driven frame, ground breaking mechanism operated by the frame to break and raise the ground as an incident to forward movement of the frame, means for forcing fertilizer into the broken ground before the broken ground settles after being broken, an endless belt supported by the implement frame, series of teeth carried by the endless belt for operating in and pulverizing the broken ground, and mechanism for operating the endless belt as an incident to forward movement of the implement to move the teeth forwardly in the ground at a more rapid rate than the movement of the implement.

9. In an agricultural implement, a power driven frame, ground breaking mechanism operated by the frame to break the ground as an incident to forward movement of the frame, means for distributing fertilizer upon the broken ground, an endless belt supported by the implement frame, series of teeth carried by the endless belt for operating in and pulverizing the broken ground, mechanism for operating the endless belt as an incident to forward movment of the implement to move the teeth forwardly in the ground at a more rapid rate than the movement of the implement, and a device for leveling the ground after operation of the pulverizer.

10. In an agricultural implement, the combination with mechanism for breaking and raising the ground, of a series of containers adapted to contain fertilizer, a discharge member for the fertilizer having a discharge outlet therein, a passage for conducting the fertilizer to the discharge outlet, means for forcing currents of air through said passage to force the fertilizer therefrom through the discharge outlet into the broken ground falling from the breaking mechanism, and mechanism for agitating and pulverizing the ground to mix the fertilizer therewith, after the fertilizer has been distributed on the broken ground.

11. In an agricultural implement, a power driven frame, a series of containers adapted to contain fertilizer, toothed wheels for delivering the fertilizer from the containers, mechanism for revolving said wheels, a passage arranged to receive the fertilizer delivered by said wheels, air pumps for forcing the fertilizer through said passage, automatic mechanism for operating said air pumps as the implement moves, and a discharge member having a discharge outlet through which the fertilizer may be distributed upon the ground.

12. In an agricultural implement, the combination with mechanism for breaking and raising the ground, of containers adapted to contain fertilizer, mechanism for removing the fertilizer from said containers, a passage arranged to receive the fertilizer removed from the containers, air pumps, automatic mechanism for operating said air pumps to force the fertilizer from said passage, and an outlet from said passage through which the fertilizer passes into the broken ground before it settles after falling from the ground breaking mechanism.

13. In an agricultural implement, the combination with mechanism for breaking and raising the ground, of containers adapted to contain fertilizer, means for removing the fertilizer from said containers, a passage arranged to receive the fertilizer removed from the containers, air pumps, automatic mechanism for operating said pumps to force the fertilizer from said passage, an outlet from said passage through which the fertilizer passes into the broken ground before it settles after falling from the ground breaking mechanism, and mechanism for agitating and stirring the broken ground and the fertilizer after they settle as required to mix them together.

14. An agricultural implement, comprising a power propelled frame, wheels supporting said frame, a revoluble shaft supported by said frame, gearing operated by said wheels for rotating said shaft, plows in connection with said shaft for breaking the ground, mechanism for forcing quantities of air into the ground before the ground settles after being broken by the plows, a shaft for operating the said mechanism, and means for rotating said last-named shaft from the first-named shaft whereby said mechanism will be operated concurrently with the operation of the plows.

15. An agricultural implement, comprising a power propelled frame, plow mechanism mounted in said frame for breaking the ground, a shaft, means for rotating said shaft concurrently with the operation of the plow mechanism, mechanism driven by said shaft for forcing quantities of air into the ground before the ground settles after being broken by the plow mechanism, and a pulverizer driven by said shaft for working the ground after the air has been forced into the broken ground.

16. An agricultural implement, comprising a power propelled frame, plow mechanism mounted in said frame for breaking the ground, a shaft, means for rotating said shaft as an incident to movement of the implement, mechanism driven by said shaft for forcing quantities of air into the broken ground before the ground settles after being broken by the plow mechanism, a pulverizer driven by said shaft for working the ground after the air has been forced into the ground as aforesaid, and planting mechanism operating to plant the seeds in the ground after operation of the pulverizer.

17. An agricultural implement, comprising a power propelled frame, plow mechanism mounted in said frame for breaking the ground, a shaft, means for rotating said shaft as an incident to movement of the implement, mechanism driven by said shaft for forcing quantities of air into the broken ground before the ground settles after being broken by the plow mechanism, a pulverizer driven by said shaft for working the ground after the air has been forced into the ground as aforesaid, planting mechanism operating to plant the seeds in the ground after operation of the pulverizer, and a drag operated by said frame to level the ground after operation of the planting mechanism.

18. An agricultural implement, comprising mechanism for cutting the vegetation and breaking the ground, mechanism for forcing air into the broken ground before the ground settles after being broken, and means for leveling the ground after the air has been forced into the broken ground.

19. In an agricultural implement, a power driven frame, plow mechanism mounted in said frame for breaking and raising the ground, air pumps supported by said frame, passages from said air pumps for delivering air therefrom into the broken ground before the ground settles after being broken, and mechanism actuated by the plow mechanism in said frame for operating said air pumps to force air into the broken ground before the ground settles after being broken as the implement moves.

In witness whereof, I have hereunto signed this specification.

EDWARD J. DOUGHERTY.